United States Patent
Ma et al.

(10) Patent No.: US 12,044,819 B2
(45) Date of Patent: Jul. 23, 2024

(54) RESISTIVITY DETERMINATION FROM ONE TRANSMITTER AND ONE RECEIVER ANTENNAS

(71) Applicant: Halliburton Energy Services, Inc., Houston, TX (US)

(72) Inventors: Jin Ma, Houston, TX (US); Clint Lozinsky, Kingwood, TX (US); Hsu-Hsiang Wu, Sugarland, TX (US); Yi Jing Fan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/806,643

(22) Filed: Jun. 13, 2022

(65) Prior Publication Data

US 2022/0397695 A1    Dec. 15, 2022

Related U.S. Application Data (60) Provisional application No. 63/202,499, filed on Jun. 14, 2021.

(51) Int. Cl.
  *G01V 3/30* (2006.01)
  *E21B 47/13* (2012.01)
  *G01V 3/28* (2006.01)

(52) U.S. Cl.
  CPC .............. *G01V 3/30* (2013.01); *E21B 47/13* (2020.05); *G01V 3/28* (2013.01)

(58) Field of Classification Search
  CPC ... G01V 3/30; G01V 3/28; G01V 3/26; G01V 3/24; E21B 47/13; E21B 47/00; E21B 47/0025; E21B 49/00
  USPC ......................................................... 324/338
  See application file for complete search history.

(56) References Cited

U.S. PATENT DOCUMENTS

| | | | |
|---|---|---|---|
| 8,954,280 B2 | 2/2015 | Li et al. | |
| 2009/0171587 A1 | 7/2009 | Lu | |
| 2012/0283951 A1* | 11/2012 | Li | G01V 3/28 702/7 |
| 2013/0169279 A1* | 7/2013 | Morys | G01V 11/007 324/338 |

(Continued)

OTHER PUBLICATIONS

International Search Report and Written Opinion dated Sep. 29, 2022 for corresponding PCT Patent Application No. PCT/US2022/072917 filed on Jun. 14, 2022.

*Primary Examiner* — Tung X Nguyen
*Assistant Examiner* — Robert P Alejnikov, Jr.
(74) *Attorney, Agent, or Firm* — K&L Gates LLP (57) ABSTRACT

A system and a method for evaluating a subterranean earth formation include a logging tool locatable in a wellbore dispose in the formation. The logging tool may include a transmitter antenna and a single receiver antenna. The transmitter antenna is configured to transmit a first electromagnetic signal into the subterranean earth formation. The system further includes a processor and a non-transitory memory device. The memory device includes instructions that cause the processor to control a current and a voltage sourced to the transmitter antenna, receive, via the single receiver antenna, a second electromagnetic signal emitted by the subterranean earth formation in response to receiving the first electromagnetic signal, and determine a resistivity of the subterranean earth formation based on the second electromagnetic signal.

18 Claims, 4 Drawing Sheets

(56) References Cited

U.S. PATENT DOCUMENTS

| | | |
|---|---|---|
| 2013/0285665 A1 | 10/2013 | Wu et al. |
| 2015/0035535 A1* | 2/2015 | Liu .......................... G01V 3/12 |
| | | 324/338 |
| 2018/0347280 A1 | 12/2018 | Zhong et al. |
| 2019/0078435 A1* | 3/2019 | Song ........................ G01V 3/38 |
| 2020/0309984 A1 | 10/2020 | Pan et al. |

* cited by examiner

RESISTIVITY DETERMINATION FROM ONE TRANSMITTER AND ONE RECEIVER ANTENNAS

BACKGROUND

This section is intended to provide relevant background information to facilitate a better understanding of the various aspects of the described aspects. Accordingly, it should be understood that these statements are to be read in this light and not as admissions of prior art.

Petroleum drilling and production operations demand a great quantity of information relating to the parameters and conditions downhole. Such information may include the location and orientation of the wellbore and drilling assembly, earth formation properties, and parameters of the downhole drilling environment. The collection of information relating to formation properties and downhole conditions is commonly referred to as "logging", and can be performed during the drilling process itself (hence the term "logging while drilling" or "LWD," frequently used interchangeably with the term "measurement while drilling" or "MWD").

Various measurement tools are used in LWD or wireline applications. One such tool may include a resistivity tool, which includes one or more antennae for receiving a formation response and may include one or more antennae for transmitting an electromagnetic signal into the formation at a measurement depth. When operated at low frequencies, the resistivity tool may be called an induction tool, and at high frequencies the resistivity tool may be called an electromagnetic wave propagation tool. Though the physical phenomena that dominate the measurement may vary with frequency, the operating principles for the tool are consistent.

BRIEF DESCRIPTION OF THE DRAWINGS

Aspects of the invention are described with reference to the following figures. The same numbers are used throughout the figures to reference like features and components. The features depicted in the figures are not necessarily shown to scale. Certain features of the aspects may be shown exaggerated in scale or in somewhat schematic form, and some details of elements may not be shown in the interest of clarity and conciseness.

DETAILED DESCRIPTION

In subsurface drilling for oil or other liquid extractable resources from underground geological strata, the drill bit may be directed into the strata containing the extractable resources. Such resources may be associated with certain types of strata. It is therefore helpful to determine the type of strata into which the drill is directed. The strata may be characterized by any of a number of physical properties including, as one non-limiting example, the resistivity of the strata material. It is useful to characterize the strata during the drilling operation, so that the direction and orientation of the drill bit may be adjusted in real time. This real time determination of strata characteristics is part of the logging while drilling (LWD) process.

Not only is it helpful to characterize the strata immediately adjacent to the wellbore (shallow depth of measurement), but it is also helpful to characterize the strata extending at some distance orthogonal to the wellbore direction (deep strata data). In this manner, the drill bit may be directed closer to strata that may contain the extractable resources, a process termed "geosteering." As disclosed above, one method of determining the azimuthal resistance (including signal amplitude and signal phase) may be to transmit an alternating current (AC) signal into the strata and to receive a signal conducted, transmitted, or reflected from the strata. Such signals, termed azimuthal or measurement depth resistivities, may be considered signals emitted by the strata in response to receiving the transmitted AC signal. The transmitter and receiver elements may be housed in a logging device disposed close to the drill bit.

In some currently used systems to measure the azimuthal resistivities, multiple coaxial receiver antennae are used to receive the emitted AC signal from the strata. In such currently used systems, the transmitter antenna transmits one or more AC signals having frequencies in the range of about 100 KHz to about 2 MHz. Such high frequency radio frequency (RF) signals may have a penetration depth into the surrounding strata of only about 1 ft. to about 10 ft. (about 0.3 m to about 3 m). As a result, the distance of the receiver to the transmitter can be about 1 ft. to about 10 ft. (about 0.3 m to about 3 m). However, at this distance, a single receiver may suffer from mandrel or collar effects. Mandrel or collar effects may occur due to the RF signal transmitted by the transmitter conducted along the outer housing of the logging tool. In order to cancel this effect, a second receiver antenna disposed further from the transmitter may be used. Due to the inherent resistivity of the outer housing, the RF signal received by the second antenna may be less than that received by the first antenna by a known amount. In this manner, the mandrel or collar effects can be corrected based on the paired measurements of the first and second receiver antennae.

Deep signal penetration may encompass a signal penetration depth of about 50 ft. (about 15 m) while ultra-deep signal penetration may encompass a signal penetration depth of about 100 ft. to about 200 ft. (about 30.5 m to about 61 m). The penetration depth of the signal into the strata is inversely proportional to the transmitter frequency. Thus, transmission frequencies for deep and ultra-deep measurements may be in the range of about 1 KHz to about 100 KHz. Because of the spread of the signal emitted by the deeper strata, the receiver antenna may be disposed at a greater distance from the transmitter compared to the receiver/transmitter distance required for the high frequency, shallow depth of measurement, case. Thus, to resolve signals emitted from the deeper strata, the transmitter to receiver distance may be about 100 ft. (about 30.5 m). If a dual receiver antenna configuration is used, the second receiver antenna may be located at sufficient distance from the transmitter that it may be located on a different sub.

It may be understood that it is useful to use deep or ultra-deep sensing techniques to obtain a more extensive map of the strata surrounding a well bore. To do so would require the use of lower RF transmitter frequencies and a greater distance of the receiver antenna from the transmitter. Ideally, a single antenna would be used in order to prevent long distances from the second receiver to the transmitter, and to cut costs in the number of receivers used. Therefore, it would be an improvement to the determination of strata azimuthal resistivities if a single receiver antenna, disposed near the transmitter, may be used to obtain good quality azimuthal resistivities at deeper measurement distances during deep or ultra-deep drilling.

Figure 1:
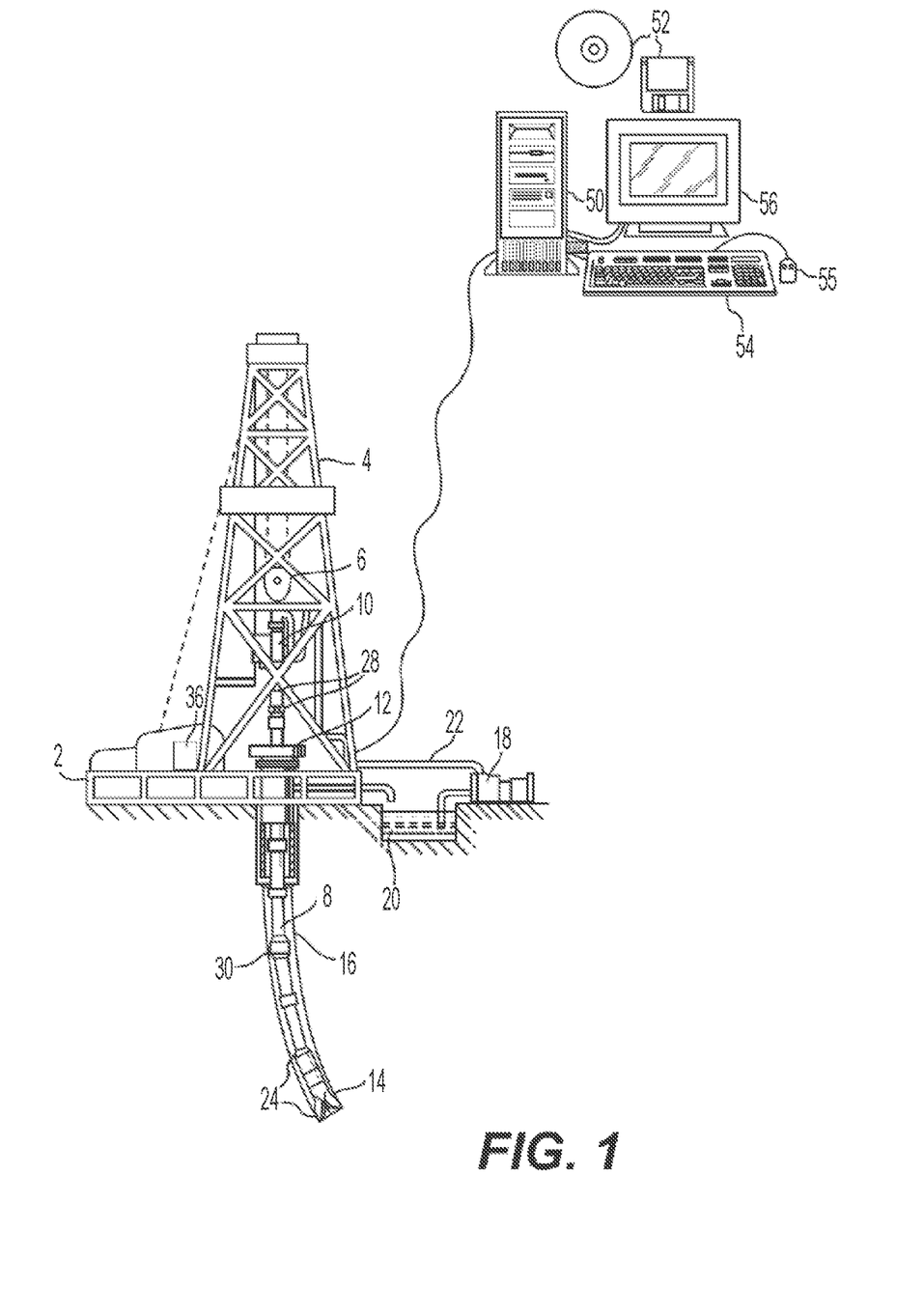
FIG. 1 depicts an elevation view of a logging-while-drilling environment, according to one or more aspects.

FIG. 1 shows one or more aspects of an illustrative LWD environment. A drilling platform 2 supports a derrick 4 having a traveling block 6 for raising and lowering a drill string 8. A top drive 10 supports and rotates the drill string 8 as it is lowered through the wellhead 12. A drill bit 14 is driven by a downhole motor and/or rotation of the drill string 8. As bit 14 rotates, it creates a wellbore 16 that passes through the various strata of the subterranean formation. A pump 18 circulates drilling fluid 20 through a feed pipe 22, through the interior of the drill string 8 to drill bit 14. The fluid exits through orifices in the drill bit 14 and flows upward through the annulus around the drill string 8 to transport drill cuttings to the surface, where the fluid is filtered and recirculated.

The drill bit 14 is just one piece of a bottom-hole assembly 24 that includes a mud motor and one or more "drill collars" (thick-walled steel pipes) that provide weight and rigidity to aid the drilling process. In some aspects, these drill collars include built-in logging instruments to gather measurements of various drilling parameters such as, without limitation, location, orientation, weight-on-bit, wellbore diameter, etc. The tool orientation may be specified in terms of one or more of a tool face angle (rotational orientation), an inclination angle (the slope), compass direction, and any combination or combinations thereof, each of which can be derived from measurements by one or more sensor types. Such sensor types may include, without limitation, magnetometers, inclinometers, and/or accelerometers, although other sensor types such as gyroscopes may alternatively be used. In one specific aspect, the tool may include a 3-axis fluxgate magnetometer and a 3-axis accelerometer. As is known in the art, the combination of those two sensor systems may enable the measurement of the tool face angle, inclination angle, and compass direction. Such orientation measurements can be combined with gyroscopic or inertial measurements to accurately track tool position and orientation.

The bottom-hole assembly 24 may include one or more aspects of measurement devices such as, without limitation, resistivity monitors, gamma ray monitors, drill string 8 angular orientation monitors, pressure monitors, temperature monitors, and other devices to measure the physical conditions within the wellbore. Such devices may be used, without limitation, to measure formation resistivity, formation gamma ray intensity, the inclination and azimuth of the drill string 8, wellbore pressure, and wellbore temperature, among other physical parameters to characterize the wellbore environment. In an aspect, a bottom-hole assembly 24 may include a telemetry sub to maintain a communications link with the surface. In one aspect, mud pulse telemetry may be one common telemetry technique for transferring tool measurements data to surface receivers and receiving commands from the surface, but other telemetry techniques can also be used. One non-limiting aspect of techniques for transferring tool measurement data to the surface and receiving comments from the surface may include through-wall acoustic signaling, wherein the drill string 8 may include one or more repeaters 30 to detect, amplify, and re-transmit signals both from the bottom of the wellbore to the surface, and from the surface to the bottom-hole assembly 24. At the surface, transducers 28 may convert signals between mechanical and electrical form, enabling a network interface module 36 to receive the uplink signal from the telemetry sub and (at least in some aspects) transmit a downlink signal to the telemetry sub.

A computer system 50 located at the surface may receive a digital telemetry signal, demodulate the signal, and display the tool data or well logs to a user. Although FIG. 1 depicts the computer system 50 as being hardwired to the telemetry system, it should be appreciated that the computer system 50 may be in wireless communication with the telemetry system. The computer system 50 may include a processor capable of executing instructions that may be stored in a non-transitory machine-readable medium 53 (for example, ROM, EPROM, EEPROM, flash memory, RAM, a hard drive, a solid state disk, an optical disk, or a combination thereof). The processor of the computer system 50 may include one or more processors located at the surface or in the wellbore, such as integrated with the bottom-hole assembly 24. Software (represented in FIG. 1 as the non-transitory machine-readable medium 52) may govern the operation of the system 50. A user, for example a driller, may interact with the system 50 and the software 52 via one or more input devices 54 and 55 and one or more output devices 56. In some system aspects, the driller may employ the system 50 to make geosteering decisions (for example modifying the wellbore trajectory or steering the drill bit 14) and communicate appropriate commands to the bottom-hole assembly 24 to execute those decisions. On receipt of the geosteering instructions from the user, the bottom-hole assembly 24 may change its orientation or speed accordingly. The computer system 50 may be operable to perform calculations or operations to evaluate the formation, identify formation boundary positions, and/or steer the drill bit 14 as further described herein.

The drillstring shown in FIG. 1 illustrates a directional drilling operation, wherein drilling is performed along a path other than a straight vertical path downward. In at least some illustrative aspects, the change in direction may be achieved using a "bent sub," comprising a bent or curved tubular section along the drillstring near the drill bit. The bend or curve may be fixed or variable, with the direction of the drilling being determined either by the bend alone, or by a combination of the bend and the rotation of the drillstring. For example, if a downhole motor is used to drive the drill bit and a drillstring with a fixed bent sub is maintained at a fixed azimuthal orientation, the drill string may gradually change direction towards the direction of the bend. If instead such a drillstring is rotated, drilling will progress along a line parallel to the drillstring section above the bend and about which the drill bit processes.

For drillstrings capable of varying the angle of the bent sub, the sub is set to a desired angle and direction while the drillstring is maintained at a desired fixed azimuthal orientation, with the drill bit being driven by the downhole motor. This is sometimes referred to as "slide drilling," as the drillstring slides through the wellbore without rotating. In other drillstring aspects, the drillstring may continue to rotated and the angle of the bent sub may be maintained by applying a force on the drillstring in a specific direction. This causes the sub to be pushed into the wellbore wall opposite the desired drilling direction to create an angle between the drillstring pipes and/or bottom-hole assembly units to either side of the sub. Such systems are sometimes referred to as rotary steerable systems.

Because of the angle change introduced by the above-described subs and systems used in directional drilling, and because of the bends produced in the drillstring by the resulting wellbore, logging tool subs located along the length of the drillstring may be oriented in different directions. This is particularly true for logging tools used in deep formation evaluation for example, tools in which a transmitter antenna is separated from a receive antenna by at least 20 feet (6 m). Thus, the transmitter and receiver antennas used in such tools may be housed in logging tool subs that are separated by larger distances (compared to other logging tools) in order to achieve the desired formation penetration of the transmitted signals. The greater the distance between the logging tool subs, the greater the inclination and strike angle differences may be between drillstring sections traversing a wellbore path that is curved or otherwise not a straight line. As used herein, the inclination angle of an LWD tool sub that houses an antenna may be defined as the angle between a true vertical z axis and the drillstring's z axis local to the antenna. The strike angle is defined as an angle between a reference vector normal to a vertical z axis and a projection onto a horizontal x-y plane of the drillstring's z axis local to the antenna (as illustrated in FIG. 2).

Figure 2:
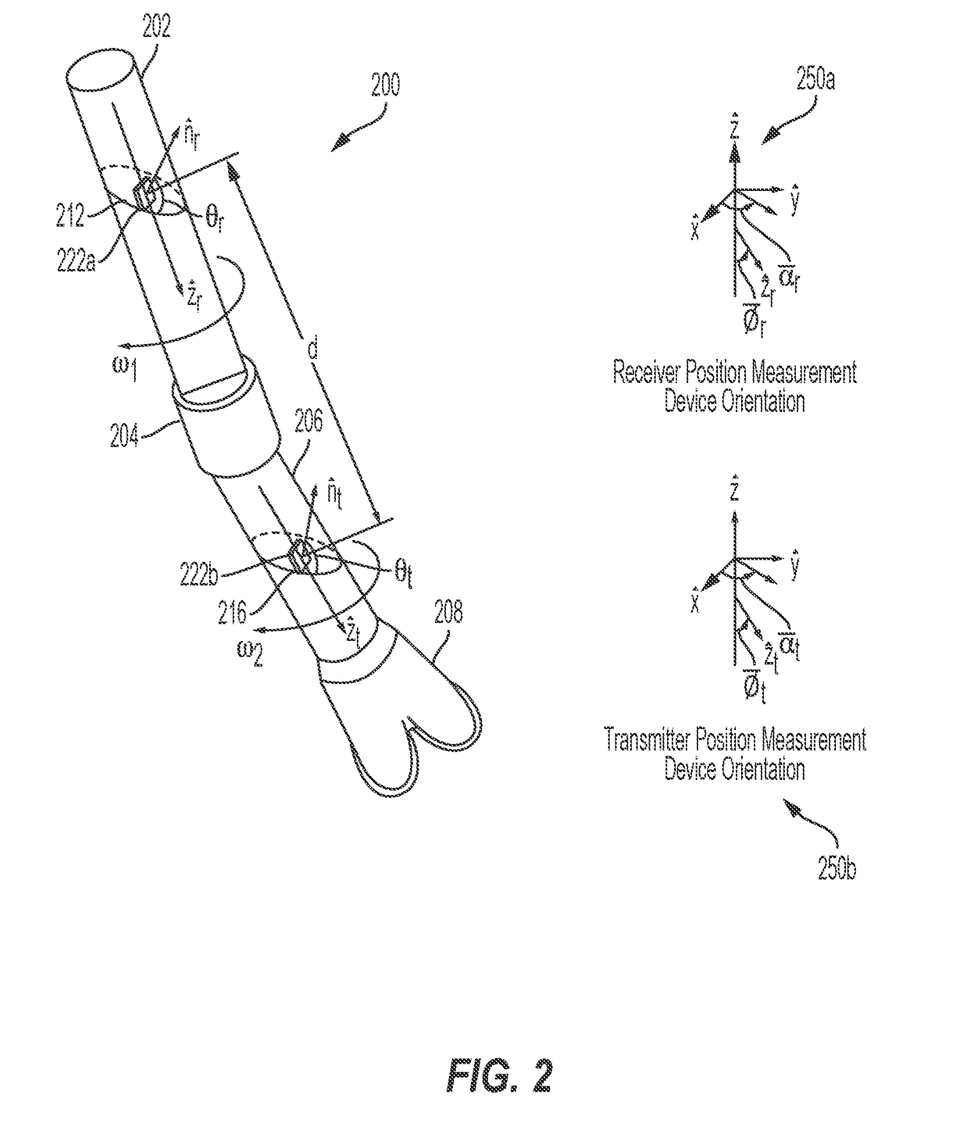
FIG. 2 depicts a schematic view of a resistivity logging tool, according to one or more aspects.

FIG. 2 shows a schematic view of a deep resistivity logging tool 200, in accordance with one or more aspects. The resistivity logging tool 200 may be included with the bottom-hole assembly 24 of FIG. 1 and may include, without limitation, two LWD tool subs 202 and 206 at different locations and orientations along the drillstring. A single resistivity logging tool receiver antenna 212 and a corresponding receiver antenna position measurement device 222a may be housed within the LWD tool sub 202 (the "receiver sub"). Similarly, a resistivity logging tool transmitter antenna 216 and a corresponding transmitter antenna position measurement device 222b (components of an "at bit" instrument) are housed within the LWD tool sub 206 (the "transmit sub") and closer to the drill bit 208.

The position measurement devices 222a,b locate the position and orientation of each corresponding antenna within the wellbore. For example, the positions and orientations of the transmitter and receiver antennae may be expressed, for example, in terms of each antenna's tilt angle, azimuth angle, inclination angle, and a distance between the two antennae. Thus, the receiver tilt angle $\theta_r$ and transmitter tilt angle $\theta_t$ may be measured relative to the receiver sub longitudinal axis $z_r$ and transmitter sub longitudinal axis $z_t$, respectively Thus, tilt angles $\theta_r$ and $\theta_t$ may be considered local angular measurements of the receiver and transmitter. Exemplary tilt angles $\theta_r$ and $\theta_t$ may range from 0 degrees (a coaxial antenna) to 180 degrees (co-planar antenna). Non-limiting examples of tilt angles may include about 0 degrees, about 45 degrees, about 90 degrees, about 135 degrees, about 180 degrees, or any value of range of values therebetween including end points. In one aspect, the receiver tilt angle $\theta_r$ may be about 0 degrees (coaxial) and the transmitter tilt angle $\theta_t$ may be about 45 degrees. In another aspect, the receiver tilt angle $\theta_r$ may be about 45 degrees and the transmitter tilt angle $\theta_t$ may be about 0 degrees (coaxial). As disclosed above, mandrel or collar effects may occur due to the RF signal from the transmitter antenna being conducted along the outer housing of the logging tool. If the transmitter antenna has a tilt angle that differs from that of the receiver antenna, the receiver antenna will receive less of the RF signal transmitted along the outer housing of the logging tool, and thus minimize the mandrel or collar effects.

Each antenna's azimuthal angle $\alpha_r$ and $\alpha_t$ may be measured relative to a reference coordinate system x axis. Each LWD tool sub's inclination angle $\phi_r$ and $\phi_t$ may be measured relative to the reference coordinate system z axis. The reference coordinate system may be defined above ground at the well site. The reference z axis may point to gravitational vertical, and the reference x and y axes may be defined with reference to true north or magnetic north. Thus, azimuthal angles $\alpha_r$ and $\alpha_t$ and inclination angles $\phi_r$ and $\phi_t$ may be dependent on the position and orientation of the receiver antenna and the transmitter antenna within the borehole. As disclosed above, the receiver azimuthal angle $\alpha_r$ and inclination angle $\phi_r$ are measured with respect to the reference axes 250a. As disclosed above, the transmitter azimuthal angle $\alpha_t$ and inclination angle $\theta_t$ are measured with respect to the reference axes 250b. The distance d' may be measured between the transmitter antenna and the receiver antenna. The distance d' may be in a range of about 10 ft. (about 3 m) to about 200 ft. (about 61 m). Non-limiting examples of the distance between the transmitter antenna and the receiver antenna may be about 10 ft. (about 3 m), about 40 ft. (about 12 m), about 80 ft. (about 24 m), about 100 ft. (about 30 m), about 140 ft. (about 43 m), about 180 ft. (about 55 m), about 200 ft. (about 61 m), or any value or range of values therebetween including endpoints. It may be understood that the spread of the signal emitted by the strata may depend, at least in part, on the penetration depth of the RF signal irradiating the strata. Thus, the spread of the emitted signal may be greater using RF frequencies that range from about 1 KHz to about 100 KHz (greater penetration depth) than for RF frequencies that range from about 100 KHz to about 2 MHz (smaller penetration depth). For systems using the lower irradiation frequencies, the receiver antenna may be disposed at a greater distance from the transmitter compared to the receiver/transmitter distance used for higher frequency measurements in order to receive more of the emitted signal from the strata. Further, each of the receiver antenna and the transmitter antenna may be defined by a plane, each antenna plane having a normal vector $n_r$ and $n_t$, respectively. All of these values may be known initially or readily calculated during drilling.

In FIG. 2, it should be noted that although the bent sub angles may be typically less than five degrees, the illustrations herein depict a more pronounced angle merely to better illustrate the effect of the angles on the relative spatial locations of the antennae, described in more detail below.

During drilling operation, both the receiver sub and the transmitter sub may rotate about their respective longitudinal axes, $z_r$ and $z_t$ at rotational rates $\omega_1$ and $\omega_2$, respectively. Exemplary rotational rates $\omega_1$ and $\omega_2$ may have a range of values between about 10 rpm and about 300 rpm. Non-limiting examples of a rotation rate may include about 10 rpm, about 20 rpm, about 30 rpm, about 50 rpm, about 100 rpm, about 200 rpm, about 300 rpm, or any value of range of values therebetween including end points. Typically, both the receiver sub and the transmitter sub rotate in synchrony.

The resistivity logging tool 200 in communication with the computer system 50 of FIG. 1 may be used to determine formation resistivity, which, in turn, may be used to evaluate the formation and/or determine a wellbore trajectory to produce formation fluids, such as hydrocarbon fluids. It should be appreciated that the resistivity logging tool 200 is an exemplary tool for measuring formation data and other suitable logging tools may be used. Also, other resistivity logging tools may employ different antenna configurations to evaluate the formation resistivity.

The formation resistivity may be used to generate a resistivity model of the formation and determine the uncertainty of a parameter included in or determined from the formation data. A resistivity model may be used to identify boundary positions between formation layers (strata) and determine the wellbore trajectory to produce formation fluids. The uncertainty of a parameter indicates a range of suitable values for a particular parameter such as the uncertainty of resistivity values or boundary positions of formation strata. For instance, the uncertainty of a boundary position may provide an indication of where a formation boundary may be located and the extent to which that formation boundary position may vary. As used herein, the uncertainty of a parameter refers to a range of suitable values for the parameter or a measure that is used to quantify a variation in the parameter (e.g., standard deviation). The parameter may include, without limitation, any one or any combination of a horizontal resistivity, vertical resistivity, conductivity, an anisotropy ratio, a boundary position of formation layers, and a formation dip.

When determining formation resistivity, the transmitter antenna 216 transmits an AC signal at a known phase, amplitude, and frequency through the formation. The phase, amplitude, and frequency of the signal may be predetermined, or may be determined as the signal is transmitted, based on a current and/or voltage used by the transmitter antenna 216 to transmit the signal. Further, such determinations of phase, amplitude, and/or frequency may be made by a computer system within the logging tool 200 and/or by the computer system 50 of FIG. 1. In some aspects, the transmission frequency of the transmit antenna 216 may be in a range of about 1 KHz to about 100 KHz. Non-limiting examples of the transmission frequency may include about 1 KHz, about 3 KHz, about 5 KHz, about 10 KHz, about 30 KHz, about 50 KHz, about 100 KHz, or any value of range of values therebetween including end points. As disclosed above, the penetration depth of the RF signal into the strata is dependent on its frequency. Thus, a frequency or range of frequencies may be chosen depending on the desired penetration depth for the measurement.

The signal transmitted by the transmitter antenna 216 may be attenuated and/or undergo a change in phase as it passes through the formation and is emitted thereby. The signal emitted by the formation may then be received by the receiver antenna 212. In some aspects, the voltage of the signal received by the receiver antenna may be normalized according to a current flowing through the transmitter antenna, or a power of the signal transmitted by the transmitter antenna. In this manner, the signal received by the receiver antenna may result from attenuation effectively due to the composition of the formation, and will not result from any variation in transmitter output. Additionally, the voltage of the signal received by the receiver antenna may be compensated for thermal drift errors of the antenna and/or its electronics. A phase and an amplitude for the received signal may then be determined by a computer system within the logging tool 200 and/or by the computer system 50 of FIG. 1. Additionally, the computer system within the logging tool 200 and/or by the computer system 50 of FIG. 1 may also calibrate the receiver based on the temperature and/or pressure at the location of the receiver within the wellbore.

The signal received by the receiver (that is, the signal emitted by the formation upon receiving the signal transmitted by the transmitter antenna) may be digitized. The digitized received signal may be analyzed according to a Fourier Transform algorithm to produce a receiver signal amplitude (real part) at the transmission frequency and a receiver signal phase (imaginary part) at the transmission frequency.

Figure 3:
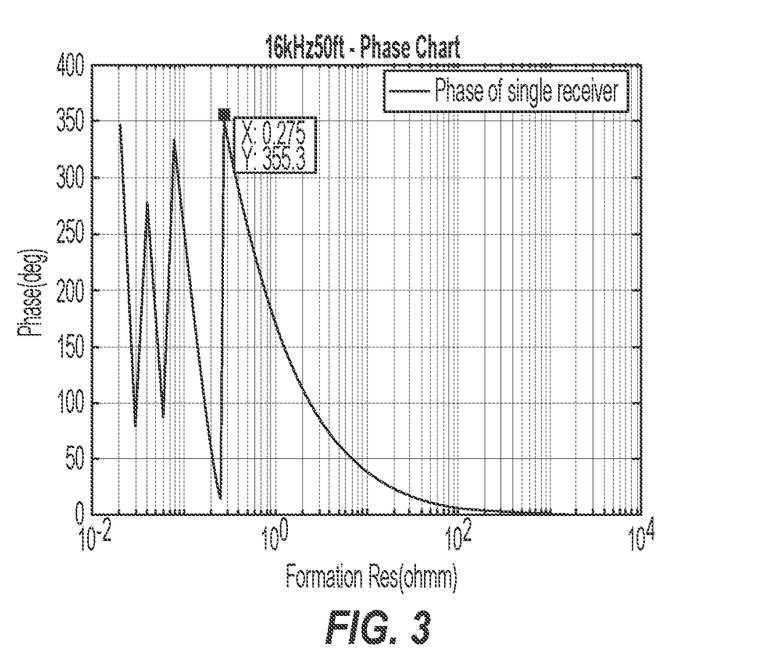
FIG. 3 depicts a phase resistivity chart for a formation, according to one or more aspects.
Figure 4:
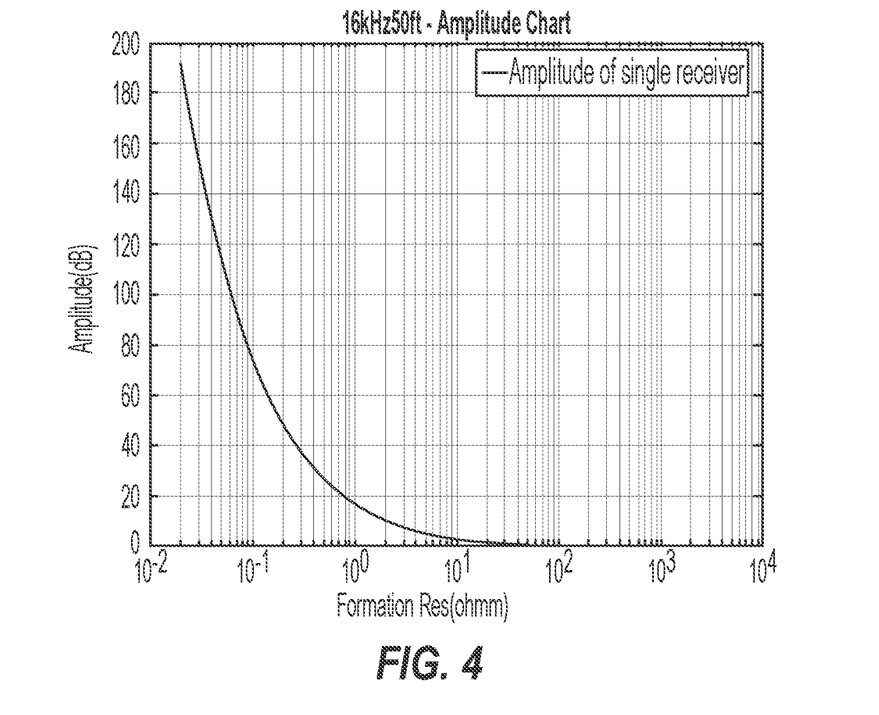
FIG. 4 depicts an amplitude resistivity chart for a formation, according to one or more aspects.

Once the receiver signal amplitude and the receiver signal phase are determined, the receiver signal amplitude and the receiver signal phase may be compared to a reference amplitude and a reference phase, respectively, to determine the resistivity of the formation. The reference phase and the reference amplitude data may be found in one or more reference graphs or look-up tables. FIGS. 3 and 4 are non-limiting examples of reference charts related to phase (FIG. 3) and amplitude (FIG. 4).

The reference graphs may be generated using electromagnetic modeling techniques. In some aspects, the electromagnetic models may be based on one or more of wave propagation models, Maxwell's equations, Green's function, or other suitable mathematical methods to model electromagnetic wave propagation. Such models may be dependent on the transmitter frequency and the transmitter antenna/receiver antenna distance. Thus, for example, FIGS. 3 and 4 represent a predicted receiver signal phase and amplitude, respectively, for a formation characterized by a known resistivity. As disclosed above, the predictions are based, at least in part, on the known transmitter signal frequency, and the known distance between the transmitter antenna and the receiver antenna. FIGS. 3 and 4 are derived for a transmitter signal frequency of 16 kHz and at a transmitter antenna to receiver antenna distance of 50 ft. (about 15 m). In some aspect, the graphs may be generated in real time as the signal is transmitted by the transmit antenna 216 or they may be generated before the signal is transmitted through the formation.

Figure 5:
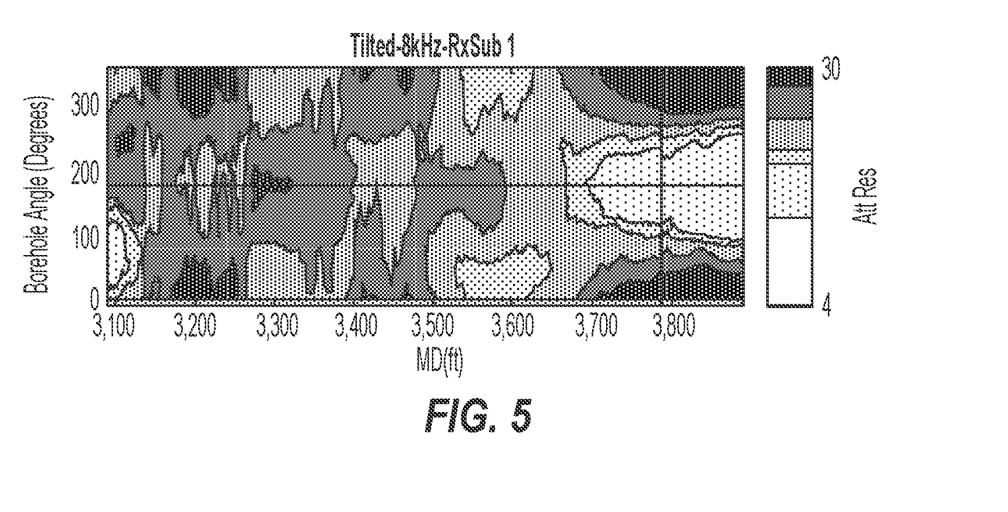
FIG. 5 depicts an azimuthal amplitude resistivity image for a formation, according to one or more aspects.

It may be observed in FIG. 4 that the predicted amplitude of the receiver signal increases monotonically within the range of the simulation (from about 10 kOhms to about 10 mOhms). Thus, any calculated receiver signal amplitude may be associated with a unique formation resistivity. However, as seen in FIG. 5, the predicted phase is essentially monotonic to about 0.275 ohm at which point the phase wraps at lower resistivity values. However, such low conductive regions are at the noise level of the tool measurement. Therefore, the conversion graphs may be truncated to the tool measurement noise level. Such truncation may result in solely monotonic curves for both amplitude and phase. Additionally, since the amplitude chart (FIG. 4) is monotonic throughout its range, the resistivity value may be determined initially from the amplitude chart, and then confirmed in an appropriate monotonic section in the phase chart. This method may thus permit the amplitude and phase resistivities to be uniquely determined.

Figure 6:
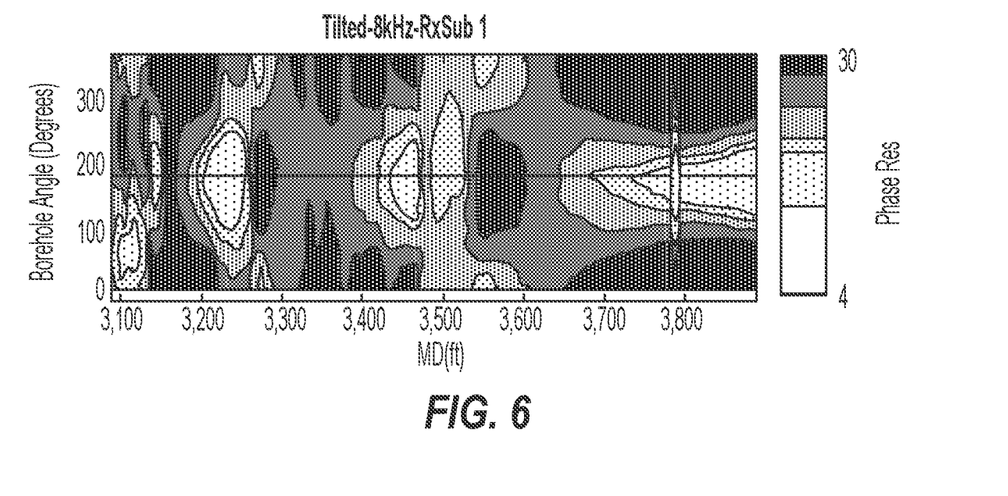
FIG. 6 depicts an azimuthal phase resistivity image for a formation, according to one or more aspects.

Once the resistivity of the formation is determined, the formation resistivity data at each azimuthal binning/rotating angle of the logging tool can be combined to generate an azimuthal resistivity image for the formation, as shown in FIGS. 5 and 6. Both FIGS. 5 and 6 are measurements made from a logging tool having a coaxial transmitting antenna and a single receiving antenna with a tilt angle of 45 degrees. The transmitter frequency for both figures is at 8 kHz. For each of FIGS. 5 and 6, the horizontal center line represents the center of the borehole along the measurement distance. For each of FIGS. 5 and 6, the ordinate represents the rotation angle of the logging tool within the borehole, and the abscissa represents the measurement depth along the well path. FIG. 5 presents the angular dependent signal amplitude resistivity while FIG. 6 presents the angular dependent signal phase resistivity. Typically, the rotation angle ranges from 0 degrees to 360 degrees to cover the circumference of the borehole. The shading of the figures, as indicated by the accompanying shading bar represents the resistivity values obtained from the reference bars at the sides. As disclosed above, resistivity data can provide information regarding the type of strata in which the borehole is drilled, Thus, the resistivity data can be interpreted to indicate types of strata which may be more likely to contain recoverable resources. As a result, a driller may view the resistivity data and decide if the drill bit should be directed into an area having a resistivity value consistent with the recoverable resources.

It should be appreciated that the system and methods described herein provide a solution necessarily rooted in downhole deep resistivity logging tools in order to overcome a problem specifically arising from inversion methods used to determine formation properties from the formation data measured using the deep resistivity logging tools. Inversion methods using formation data from the deep resistivity logging tools normally provide formation resistivity values that are distributed as multiple layers in the vertical plane or gravitational direction. The methods and system described herein provide the azimuthal resistivity distributions around the wellbore to evaluate the formation at the azimuthal direction. This azimuthal image together with the vertical one dimensional inversion image may provide more comprehensive view of the formation property, and/or steer a drill bit better for producing formation fluids.

This discussion is directed to various aspects of the present disclosure. The drawing figures are not necessarily to scale. Certain features of the aspects may be shown exaggerated in scale or in somewhat schematic form and some details of conventional elements may not be shown in the interest of clarity and conciseness. Although one or more of these aspects may be preferred, the aspects disclosed should not be interpreted, or otherwise used, as limiting the scope of the disclosure, including the claims. It is to be fully recognized that the different teachings of the aspects discussed may be employed separately or in any suitable combination to produce desired results. In addition, one skilled in the art will understand that the description has broad application, and the discussion of any aspect is meant only to be exemplary of that aspect, and not intended to suggest that the scope of the disclosure, including the claims, is limited to that aspect.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one aspect," "an aspect," or similar language means that a particular feature, structure, or characteristic described in connection with the aspect may be included in at least one aspect of the present disclosure. Thus, appearances of the phrases "in one aspect," "in an aspect," and similar language throughout this specification may, but do not necessarily, all refer to the same aspect.

Although the present invention has been described with respect to specific details, it is not intended that such details should be regarded as limitations on the scope of the invention, except to the extent that they are included in the accompanying claims.

What is claimed is:

1. A system for evaluating a subterranean earth formation, wherein a wellbore is disposed within the subterranean earth formation, the system comprising:
    an azimuthal resistivity logging tool locatable in the formation, wherein the logging tool comprises:
        a single transmitter antenna;
        one or more first sensors to determine a first position of the transmitter antenna and a first orientation of the transmitter antenna within the wellbore;
        a single receiver antenna; and
        one or more second sensors to determine a second position of the single receiver antenna and a second orientation of the receiver antenna within the wellbore; and
    a processor and a non-transitory memory device, wherein the non-transitory memory device comprises one or more reference amplitude data and one or more reference phase data relating amplitude and phase to formation resistivity and instructions that, when executed by the processor, cause the processor to:
        control a current and a voltage sourced to the transmitter antenna, causing the transmitter antenna to transmit a first electromagnetic signal into the subterranean earth formation, wherein the first electromagnetic signal is characterized by a frequency, a first amplitude, and a first phase;
        receive, via the single receiver antenna, a second electromagnetic signal emitted by the subterranean earth formation in response to receiving the first electromagnetic signal, wherein the second electromagnetic signal comprises a second amplitude and a second phase;
        determine at least one of a deep or an ultra-deep azimuthal resistivity of the subterranean earth formation based on the formation resistivity of the reference amplitude data and the reference phase data for the second amplitude and second phase; and
        generate an image of the subterranean earth formation based on the determined azimuthal resistivity.

2. The system for evaluating a subterranean earth formation of claim 1, wherein the single receiver antenna is disposed at a distance of 10 ft. (3 m) to 200 ft. (61 m) from the transmitter antenna.

3. The system for evaluating a subterranean earth formation of claim 1, wherein the transmitter antenna has a tilt angle of 0 degrees and the single receiver antenna has a tilt angle of 45 degrees.

4. The system for evaluating a subterranean earth formation of claim 1, wherein the single receiver antenna has a tilt angle of 0 degrees and the transmitter antenna has a tilt angle of 45 degrees.

5. The system for evaluating a subterranean earth formation of claim 1, wherein the frequency of the first electromagnetic signal has a range of 1 KHz to 100 KHz, selected based on a desired depth of penetration of the first electromagnetic signal into the subterranean earth formation.

6. The system for evaluating a subterranean earth formation of claim 1, wherein the non-transitory memory device further comprises instructions that, when executed by the processor, cause the processor to normalize the second electromagnetic signal according to the current sourced to the transmitter antenna.

7. The system for evaluating a subterranean earth formation of claim 1, wherein the non-transitory memory device further comprises instructions that, when executed by the processor, cause the processor to calculate the amplitude and the phase of the second electromagnetic signal.

8. The system for evaluating a subterranean earth formation of claim 1, wherein the one or more reference amplitude data and the one or more reference phase data are derived from a model.

9. The system for evaluating a subterranean earth formation of claim 8, wherein the model is based on a distance of the single receiver antenna from the transmitter antenna and the frequency of the first electromagnetic signal.

10. A method of evaluating a subterranean earth formation, comprising:
  placing an azimuthal resistivity logging tool within a formation, wherein the logging tool comprises a single transmitter antenna and a single receiver antenna;
  transmitting, by the transmitter antenna, a first electromagnetic signal having a frequency, a first amplitude, and a first phase into the subterranean earth formation;
  receiving, by the single receiver antenna, a second electromagnetic signal emitted by the subterranean earth formation in response to the first electromagnetic signal, wherein the second electromagnetic signal comprises a second amplitude and a second phase;
  providing a processor and a non-transitory memory device, wherein the non-transitory memory device comprises one or more reference amplitude data and one or more reference phase data relating amplitude and phase to formation resistivity;
  determining, using the processor, a deep or an ultra-deep azimuthal resistivity of the formation based on the formation resistivity of the reference amplitude data and the reference phase data for the second amplitude and second phase; and
  generating, using the processor, an image of the subterranean earth formation based on the determined azimuthal resistivity.

11. The method of evaluating a subterranean earth formation of claim 10, further comprising normalizing the second electromagnetic signal according to a current flowing through the transmitter antenna.

12. The method of evaluating a subterranean earth formation of claim 10, further comprising determining the amplitude and the phase of the second electromagnetic signal.

13. The method of evaluating a subterranean earth formation of claim 12, wherein determining an amplitude and a phase of the second electromagnetic signal comprises calculating a Fourier Transform of the second electromagnetic signal.

14. The method of evaluating a subterranean earth formation of claim 13, further comprising calculating a reference amplitude and a reference phase.

15. The method of evaluating a subterranean earth formation of claim 14, wherein determining the deep or ultra-deep azimuthal resistivity of the formation comprises comparing the amplitude and the phase of the second electromagnetic signal with the reference amplitude and the reference phase.

16. The method of evaluating a subterranean earth formation of claim 14, further comprising calculating the reference amplitude and the reference phase from an azimuthal resistivity model.

17. The method of evaluating a subterranean earth formation of claim 16, further comprising calculating the azimuthal resistivity model based on the frequency of the first electromagnetic signal and a distance between the transmitter antenna and the single receiver antenna.

18. The method of evaluating a subterranean earth formation of claim 16, further comprising calculating more than one reference amplitude and more than one reference phase.

* * * * *